(12) United States Patent
Wade et al.

(10) Patent No.: US 10,275,157 B2
(45) Date of Patent: Apr. 30, 2019

(54) METADATA STORAGE IN UNUSED PORTIONS OF A VIRTUAL DISK FILE

(71) Applicant: Quantum Corporation, San Jose, CA (US)

(72) Inventors: Gregory L. Wade, San Jose, CA (US); J. Mitchell Haile, Somerville, MA (US); Bill Kan, Redwood City, CA (US); Barry Herman, Atherton, CA (US)

(73) Assignee: Quantum Corporation, Redmond, WA (US)

( * ) Notice: Subject to any disclaimer, the term of this patent is extended or adjusted under 35 U.S.C. 154(b) by 0 days.

(21) Appl. No.: 15/360,774

(22) Filed: Nov. 23, 2016

(65) Prior Publication Data

US 2017/0075588 A1    Mar. 16, 2017

Related U.S. Application Data

(63) Continuation of application No. 14/223,301, filed on Mar. 24, 2014, now Pat. No. 9,524,122, which is a continuation of application No. 13/354,011, filed on Jan. 19, 2012, now Pat. No. 8,683,111.

(60) Provisional application No. 61/434,188, filed on Jan. 19, 2011.

(51) Int. Cl.
*G06F 9/455* (2018.01)
*G06F 3/06* (2006.01)

(52) U.S. Cl.
CPC ............ *G06F 3/0608* (2013.01); *G06F 3/065* (2013.01); *G06F 3/067* (2013.01); *G06F 3/0619* (2013.01); *G06F 3/0647* (2013.01); *G06F 3/0664* (2013.01); *G06F 3/0673* (2013.01); *G06F 9/45533* (2013.01); *G06F 9/45558* (2013.01); *G06F 2009/45579* (2013.01)

(58) Field of Classification Search
None
See application file for complete search history.

(56) References Cited

U.S. PATENT DOCUMENTS

| 2004/0044705 | A1* | 3/2004 | Stager ............... G06F 17/30067 |
| 2009/0240904 | A1 | 9/2009 | Austruy et al. |
| 2012/0063749 | A1* | 3/2012 | Kamijima ........ H04N 21/85406 386/328 |
| 2012/0102137 | A1 | 4/2012 | Pruthi et al. |
| 2012/0194636 | A1* | 8/2012 | Tokunaga ............ H04N 1/3876 348/36 |
| 2012/0265959 | A1 | 10/2012 | Le et al. |
| 2016/0019118 | A1 | 1/2016 | Wade et al. |

OTHER PUBLICATIONS

Zhao, et al., "Distributed File System Support for Virtual Machines in Grid Computing", 2004 IEEE, p. 202-211.
Chen, et al., "Fast, On-demand Software Deployment with Lightweight, Independent Virtual Disk Images", 2009 IEEE, p. 16-23.

* cited by examiner

*Primary Examiner* — Brian R Peugh

(57) ABSTRACT

Embodiments disclosed herein provide systems and method for storing metadata to unused portions of a virtual disk file. In a particular embodiment, a method provides selecting a virtual disk file stored on a data storage volume and identifying unused portions of the virtual disk file. The method further provides writing metadata for the virtual disk file in the unused portions of the virtual disk file.

10 Claims, 3 Drawing Sheets

METADATA STORAGE IN UNUSED PORTIONS OF A VIRTUAL DISK FILE

RELATED APPLICATIONS

This application is a continuation of U.S. patent application Ser. No. 14/223,301, now U.S. Pat. No. 9,524,122, entitled "METADATA STORAGE IN UNUSED PORTIONS OF A VIRTUAL DISK FILE," filed on Mar. 24, 2014; which is a continuation of U.S. Pat. No. 8,683,111, entitled "METADATA STORAGE IN UNUSED PORTIONS OF A VIRTUAL DISK FILE," filed on Sep. 27, 2012; which is related to and claims priority to U.S. Provisional Application No. 61/434,188, filed Jan. 19, 2011, which is hereby incorporated by reference in its entirety.

TECHNICAL BACKGROUND

In virtual machine environments, a hypervisor running on a host hardware system creates a virtual system on which a guest operating system may execute. The virtual system includes a virtual storage volume on which the guest operating system stores its data. For example, the hypervisor may simulate a hard disk for the guest operating system that the hypervisor stores as a virtual disk file on the host system. The hypervisor may keep track of information necessary to execute the guest operating system and store that information by adding it to the end of the virtual disk file as metadata.

Storing metadata in this way makes the virtual disk file larger by the size of the metadata. However, the indicated size of the metadata will remain the size of the virtual disk file without the metadata. This variation in file size causes an issue where only the hypervisor or other programs designed to access the metadata of the hypervisor, such as programs produced by the same developer that produced the hypervisor, are able to perform actions on the virtual disk file.

OVERVIEW

Embodiments disclosed herein provide systems and method for storing metadata to unused portions of a virtual disk file. In a particular embodiment, a method provides selecting a virtual disk file stored on a data storage volume and identifying unused portions of the virtual disk file. The method further provides writing metadata for the virtual disk file in the unused portions of the virtual disk file.

In some embodiments, after writing the metadata, the method further comprises storing the virtual disk file in a second data storage volume.

In some embodiments, identifying the unused portions of the virtual disk file comprises analyzing a bitmap of the data storage volume.

In some embodiments, identifying the unused portions of the virtual disk file stops once enough unused portions have been identified to hold all of the metadata.

In some embodiments, the unused portions of the virtual disk file comprise unallocated blocks of data that comprise the virtual disk file.

In some embodiments, wherein the virtual disk file is a Virtual Machine Disk (VMDK) file format.

In another embodiment a data management system is provided for storing metadata to unused portions of a virtual disk file. The system comprises a data storage volume configured to store virtual disk files. The system further includes a processor configured to select a virtual disk file stored on the data storage volume, identify unused portions of the virtual disk file and write metadata for the virtual disk file in the unused portions of the virtual disk file.

In some embodiments, the system includes a second data storage volume configured to store the virtual disk file after the metadata is written.

In some embodiments, the processor is configured to identify the unused portions of the virtual disk file by analyzing a bitmap of the data storage volume.

In some embodiments, the processor is configured to stop identifying the unused portions of the virtual disk file once enough unused portions have been identified to hold all of the metadata.

In some embodiments, the unused portions of the virtual disk file comprise unallocated blocks of data that comprise the virtual disk file.

In some embodiments, the virtual disk file is a Virtual Machine Disk (VMDK) file format.

In another embodiment, a computer readable medium having instructions stored thereon for operating a data management system is provided for storing metadata to unused portions of a virtual disk file. The instructions, when executed by the data management system, instruct the data management system to select a virtual disk file stored on a data storage volume and identify unused portions of the virtual disk file. The instructions further direct the data management system to write metadata for the virtual disk file in the unused portions of the virtual disk file.

In some embodiments, the instructions further direct the data management system to store the virtual disk file in a second data storage volume after the metadata is written.

In some embodiments, the instructions further direct the data management system to identify the unused portions of the virtual disk file by analyzing a bitmap of the data storage volume.

In some embodiments, the instructions further direct the data management system to stop identifying the unused portions of the virtual disk file once enough unused portions have been identified to hold all of the metadata.

In some embodiments, the unused portions of the virtual disk file comprise unallocated blocks of data that comprise the virtual disk file.

In some embodiments, the virtual disk file is a Virtual Machine Disk (VMDK) file format.

DETAILED DESCRIPTION

Figure 1:
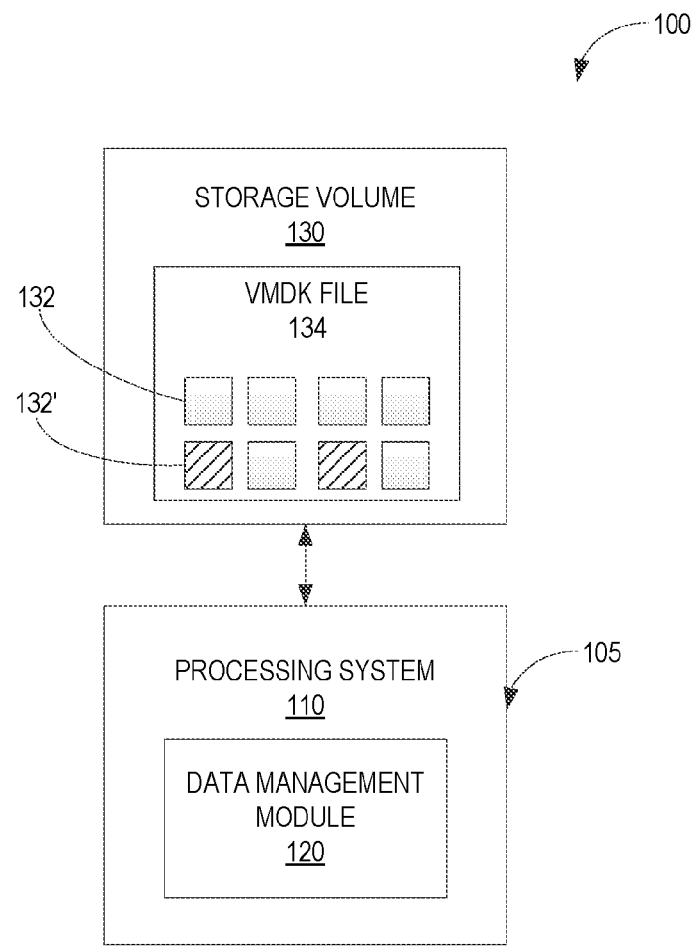
FIG. 1 illustrates a data management system according to one example.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Methods, computer readable media, and systems are provided herein for inserting metadata into unused portions of a VMDK file or any other type of virtual disk file format. The metadata describes the file, the virtual environment, and other information used by computing systems for handling the file. By generating metadata that maintains this data and including the metadata within the same VMDK file, the systems and methods herein may allow various platforms to utilize the VMDK file without tracking the VMDK file since the relevant information for the VMDK file is contained therein.

Such a configuration may allow the VMDK file to be migrated across platforms since the information for handling the file is maintained within the file itself. Further, even if the VMDK file is utilized by the virtual machine environment in which it was generated, the metadata may reduce overhead associated with tracking the VMDK file since the data may be analyzed when desired to retrieve the relevant information.

A VMDK file, like many other types of data files, may contain unused data blocks dispersed between data blocks that contain data for the file. These unused data blocks may be a result of the way in which the file is used. For example, a VMDK file may be used by a hypervisor program to perform hardware virtualization of a virtual machine stored as the VMDK file. As the virtual machine runs, hypervisor may read and write data to the VMDK file, which acts as a virtual storage volume for the virtual machine. Consistent with a file system in physical media, a virtual file system within a VMDK file may develop unused data blocks as a result of this data manipulation.

Unused portions of the VMDK file may be identified in any suitable manner. For example, methods may be provided in which unused portions of the VMDK blocks are identified by analyzing a bitmap of the storage volume 130, by analyzing a file allocation table of storage volume 130, and/or by analyzing individual data items within the VMDK file. Once unused portions of the VMDK file have been identified, the metadata may then be inserted therein.

Such a process may allow metadata to be utilized without changing the actual size of the VMDK file, which would occur if the metadata were appended to the VMDK file. By maintaining the indicated size of the VMDK file and the actual size of the VMDK file consistent with each other, the methods, computer readable media and systems described herein allow the VMDK file to be compatible for use with a variety of backup utilities and across platforms.

FIG. 1 illustrates an exemplary a system 100 that includes a data management system 105 and data storage volume 130. While shown separately the functionality of data management system 105 and storage volume 130 may be integrated into a single system. The data management system 105 includes a processing system 110 and a data management module 120. VMDK file 134 is stored on storage volume 130. Storage volume 130 is a physical storage system that may also store files other than VMDK file 134. The data management system 105 is configured to analyze a storage volume 130 to identify unused portions of a VMDK file 134. Once the unused portions of the VMDK file 134 have been identified, metadata associated with the VMDK file 134 may then be inserted into the unused portions of the VMDK file 134.

The data management module 120 is implemented in the data management system 105 in order to manage data exchanges, transfers related to the metadata, as is described in more detail hereinafter. Such a configuration may allow the data management system 105 to cooperate with any number of backup systems or utilities to back up and/or restore VMDK file 134 on storage volume 130.

The processing system 110 comprises any system or collection of systems capable of executing the data management module 120. The processing system 110 may be a micro-processor, an application specific integrated circuit, a general purpose computer, a server computer, or any combination or variation thereof. The data management module 120 may be program instructions executable by processing system 110.

Storage volume 130 may be any type of storage volume capable of storing a volume of data. Storage volume 130 comprises a non-transitory storage medium, such as a disk drive, flash drive, tape drive, data storage circuitry, or some other physical memory apparatus.

Figure 2:
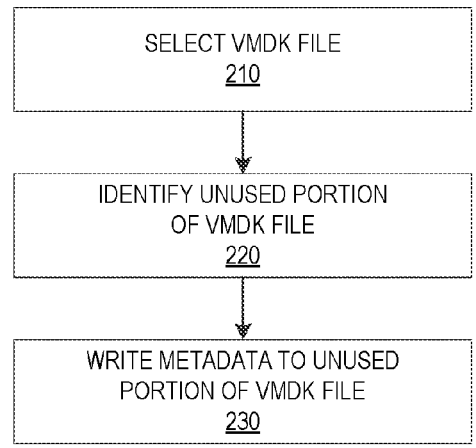
FIG. 2 illustrates the operation of a data management system.

FIG. 2 illustrates a method 200 for tracking changes according to one example. The method of FIG. 2 will be described with simultaneous reference to FIG. 1. As illustrated in FIGS. 1 and 2, the method begins at step 205 by selecting a VMDK file. Selecting a VMDK file may occur as part of a backup process, a recovery process, or any other type of process.

After the VMDK file is selected at step 210. The data management module 120 then identifies unused portions of the VMDK file at step 220. The data management module 120 may use any process to identify unused portions of the VMDK file. For example, the data management module 120 may analyze data items in the storage volume 130 to identify available space within the data items. When available space within the data items is identified, the data blocks corresponding to that unused space within the storage volume 130 may be identified. In other examples, the VMDK file 134 may be analyzed directly to identify unused portions. Such an analysis may include identifying allocated and allocated blocks within the VMDK file 134. In this example, data management system 105 recognizes unused data blocks 132' located in VMDK file 134 amongst data blocks 132 that are being used for data.

After the unused data blocks 132' have been identified at step 220, the data management system writes the metadata to unused data blocks 132' in the VMDK file 134 at step 230. As previously introduced, the metadata describes the file, the virtual environment, and other information used by computing systems for handling the file. By generating metadata that maintains this data and including the metadata within the same VMDK file 134, the systems and methods herein may allow various platforms to utilize the VMDK file 134 without tracking the VMDK file 134 since the relevant information for the VMDK file 134 is contained therein.

Such a configuration may allow the VMDK file 134 to be migrated across platforms since the information for handling the file is maintained within the file itself. Further, even if the VMDK file 134 is utilized by the virtual machine environment in which it was generated, the metadata may reduce overhead associated with tracking the VMDK file 134 since the data may be analyzed when desired to retrieve the relevant information. Accordingly, writing metadata to unused portion of the VMDK 134 file may allow the VMDK file 134 to be recovered or restored by a variety of virtual machines and across virtual machine platforms since the VMDK file 134's indicated size and actual size remain equivalent, or at least substantially equivalent, even with the inclusion of metadata within the VMDK file 134.

The data management system 105 may be any device or system capable of receiving storage instructions to transfer data between storage volumes. Accordingly, the data management system 105 may thus be, for example, a computer, a server computer, a disk array, a virtual machine running on a computer, or some other type of storage system, including any combination or variation thereof.

Figure 3:
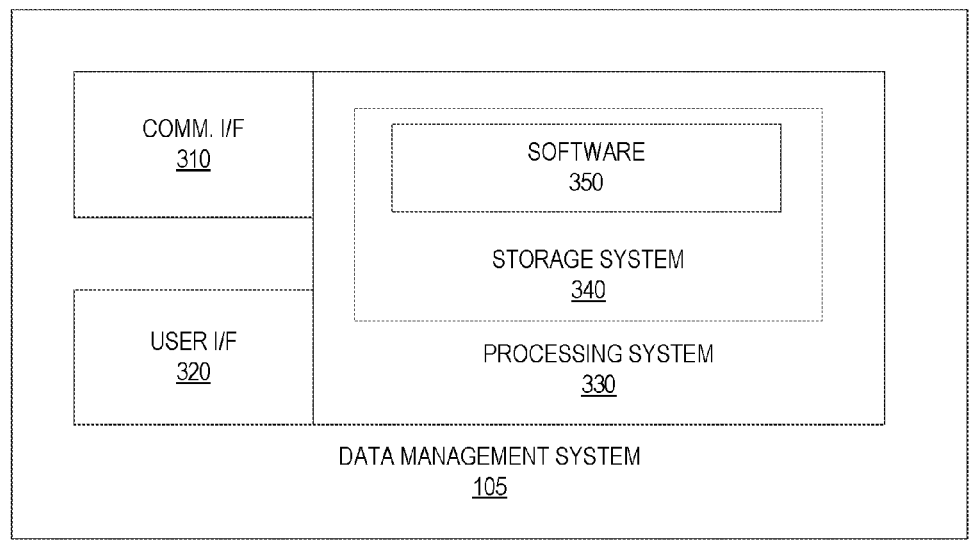
FIG. 3 illustrates a data management system.

In the example illustrated in FIG. 3, the data management system 105 includes a communication interface 310, a user interface 320, the processing system 110, storage system 340, and software 350.

The processing system 330 is linked to the communication interface 310 and the user interface 320. The processing system 330 includes processing circuitry and the storage system 340 that stores software 350. Data management system 105 may include other well-known components such as a power system and enclosure that are not shown for clarity.

In at least one example, the communication interface 310 comprises a network card, network interface, pot, or interface circuitry that allows data management system 105 to communication with various storage volumes including storage volume 130. The communication interface 310 may also include a memory device, software, processing circuitry, or other communication devices as desired. The communication interface 310 may use various protocols, such as host bus adapters (HBA), SCSI, SATA, Fibre Channel, iSCSI, WiFi, Ethernet, TCP/IP, or the like to communicate with a plurality of storage volumes, including storage volume 130.

The user interface 320 comprises components that interact with a user to receive user inputs and to present media and/or information. The user interface 320 may include a speaker, microphone, buttons, lights, display screen, mouse, keyboard, or some other user input/output apparatus—including combinations thereof. The user interface 320 may be omitted in some examples.

In at least one example, the processing system 330 may include a microprocessor and other circuitry that retrieves and executes the software 350 from the storage system 340. The software 350 may include the data management module 120 shown in FIG. 1 Referring again to FIG. 3, the storage system 340 may include a disk drive, flash drive, data storage circuitry, or some other memory apparatus. Storage system 340 may implement storage volume 130. The processing system 330 is typically mounted on a circuit board that may also hold the storage system 340 and portions of the communication interface 310 and the user interface 320.

The software 350 comprises computer programs, firmware, or some other form of machine-readable processing instructions. The software 350 may include an operating system, utilities, drivers, network interfaces, applications, or some other type of software. When executed by the processing system 330, the software 350 directs the processing system 330 to operate the data management system 105 as described herein.

In particular, software 350 directs processing system 330 to select a virtual disk file stored on a data storage volume, identify unused portions of the virtual disk file, and write metadata for the virtual disk file to at least some of the unused portions such that the indicated size of the virtual file and the actual size of the virtual file are the same.

Figure 4:
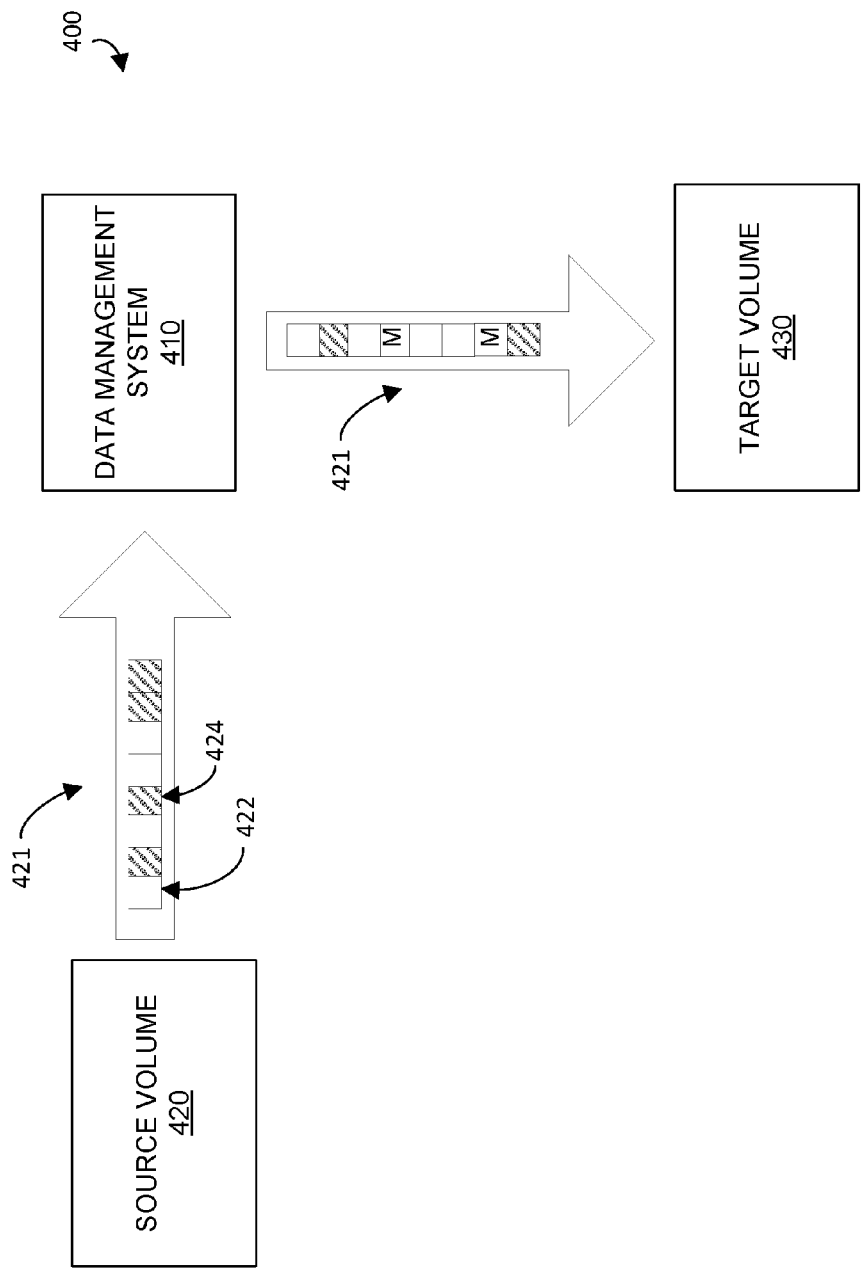
FIG. 4 illustrates a data management system.

FIG. 4 is a schematic diagram illustrating operation of a data backup system 400. As illustrated in FIG. 4, the data backup system 400 includes a data management system 410 that is configured to transfer data from a source volume 420 to a target volume 430. In at least one example, the target volume 430 may be part of a backup environment to which a backup version of selected data is transferred. It will be appreciated that the target volume 430 may be another data environment as desired.

In operation, data management system 410 selects a VMDK file 421 stored on source volume 420 for backup to target volume 430. VMDK file 421 may be selected by a user of data management system 410 or may be otherwise scheduled for backup to target volume 430. Data management system 410 then retrieves VMDK file 421 from source volume 420 so that a copy of VMDK file 421 can be stored on target volume 430.

VMDK file 421 transferred from the source volume 420 includes allocated data blocks 422 (white blocks) and unallocated data blocks 424 (lined blocks). Data management system 410 analyzes the VMDK file 421 to identify occurrences of the allocated data blocks 422 and unallocated data blocks 424. Data management system 410 may stop identifying unallocated data blocks 424 once enough unallocated data blocks are identified to store the metadata discussed below.

After identifying unallocated data blacks 424, data management system 410 then writes metadata for VMDK file 421 to at least a portion of the unallocated data blocks 424 rather than simply appending the metadata to the end of the file. Accordingly, when the copy of VMDK file 421 is transferred to target volume 430, a portion of the unallocated data blocks 421 have been allocated for use as metadata as indicated by the 'M' within a portion of the unallocated data blocks 424 transferred to target volume 430. By writing the metadata to the unallocated blocks within VMDK file 421, VMDK file 421 maintains its stated size. For example, the VMDK file 421 may indicate that it is 5 GB in size and the metadata may add 10 MB of data to the file. Using the method described above, the 10 MB of meta data is essentially "hidden" within the VMDK file 421 so that the VMDK file 421 maintains its indicated size of 5 GB. In contrast, if the metadata were appended to an end of VMDK file 421 then the actual size of VMDK file 421 would be 10 MB larger than the 5 GB indicated size.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system to handle a virtual disk file, comprising:

utilizing the virtual disk file in accordance with metadata for the virtual disk file, wherein the virtual disk file has the metadata stored within unused portions of the virtual disk file.

2. The method of claim 1, wherein utilizing the virtual disk file comprises:

migrating the virtual disk file to the computing system.

3. The method of claim 1, further comprising:

analyzing the virtual disk file to retrieve the metadata from within the unused portions of the virtual disk file.

4. The method of claim 1, wherein the metadata describes the virtual disk file and a virtual environment for the virtual disk file.

5. The method of claim 1, wherein the virtual disk file comprises a Virtual Machine Disk (VMDK) file format.

6. A system to handle a virtual disk file, the system comprising:
   one or more computer readable storage media;
   a processing system operatively coupled with the one or more computer readable storage media; and
   program instructions stored on the one or more computer readable storage media that, when read and executed by the processing system, direct the processing system to:
   utilize the virtual disk file in accordance with metadata for the virtual disk file, wherein the virtual disk file has the metadata stored within unused portions of the virtual disk file.

7. The system of claim 6, wherein to utilize the virtual disk file the program instructions direct the processing system to:
   migrate the virtual disk file to the computing system.

8. The system of claim 6, wherein the program instructions further direct the processing system to:
   analyze the virtual disk file to retrieve the metadata from within the unused portions of the virtual disk file.

9. The system of claim 6, wherein the metadata describes the virtual disk file and a virtual environment for the virtual disk file.

10. The system of claim 6, wherein the virtual disk file comprises a Virtual Machine Disk (VMDK) file format.

* * * * *